July 17, 1962     A. F. G. HANKEN     3,044,297
MEASURING SYSTEM
Filed Sept. 15, 1960
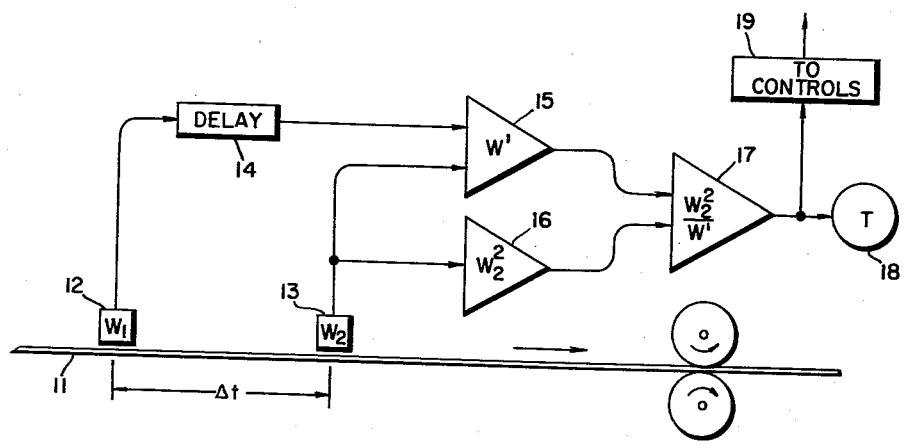
INVENTOR
Albert F.G. Hanken
By Anthony D. Cennamo United States Patent Office 3,044,297
Patented July 17, 1962

3,044,297
MEASURING SYSTEM
Albert F. G. Hanken, Columbus, Ohio, assignor to Industrial Nucleonics Corporation, a corporation of Ohio
Filed Sept. 15, 1960, Ser. No. 56,220
4 Claims. (Cl. 73—355)

This invention relates generally to method and apparatus for obtaining the temperature of a moving product in an industrial process and more particularly to arrangements employing radiation detectors for sensing the thermal radiation from a product in combination with arrangements for utilizing the sensed radiation for computing the temperature of the product independently of the emissivity of the surface of the product.

The advantages of non-contacting measuring devices in the measurement of parameters in a continuous industrial process and the utilization of such measurements for control purposes are well known. In processes where it is required to measure the temperature of the moving product the use of radiation responsive detectors placed adjacent to the moving product for sensing the thermal radiation therefrom have been employed. One of the problems encountered in this type measurement is that characteristics of the product other than its absolute temperature affect the magnitude of the radiation given off by the body. In particular the inherent nature of the particular material of which the product is made and the surface condition which may vary from time to time due to the accumulation of scale or other surface deposits on the product can result in an unknown emissivity factor. Since the emissivity factor is directly related to the radiation rate the temperature indicated by using the signal detected by a thermal radiation detector may be in error due to variations in the emissivity of the product passing the detector. These variations can influence the signal detected in the same manner that changes in temperature influence the signal.

In accordance with the present invention radiation detectors are located at spaced points along the path of travel of a product in a continuous process and the signals detected by the spaced detectors are utilized in a manner which permits the temperature of the product to be determined independently of the emissivity of the product.

It is accordingly an object of the present invention to provide an improved method and apparatus for the determination of temperature of a product in a continuous process.

A further object of the invention is to provide an improved method and apparatus for computing temperature from a plurality of radiation measurements to eliminate the effect of emissivity on the temperature measurement.

A further and specific object of the invention is to provide method and apparatus in accordance with the foregoing objects in which the temperature of a steel strip in a steel mill can be determined independently of the grade and surface condition of the moving steel strip.

These and other objects of the invention will be apparent from the following detailed description taken in conjunction with the accompanying drawing in which the single FIGURE shows in block diagram form an arrangement suitable for practicing the invention.

The rate at which thermal radiation emanates from a heated body is related to the temperature of that body by the law of Stefan-Boltzmann as follows:

$$W = E_r \sigma T^4 \quad (1)$$

where:

$W$=total radiation energy per second
$E_r$=emissivity ($0 \leq E \leq 1$)
$T$=absolute temperature of the body
$\sigma$=radiation constant $5.75 \times 15^5$ ergs/cm.$^2$/sec./T$^4$ By differentiating Equation 1 with respect to time we obtain:

$$\frac{dW}{dt} = W' = 4E_r \sigma T^3 \frac{dT}{dt} = 4 \frac{W}{T} \frac{dT}{dt} \quad (2)$$

A second expression for the radiation rate $W$ is obtained in terms of the temperature drop due to radiation losses:

$$W = -C_p \frac{dT}{dt} \quad (3)$$

where $C_p$=thermal capacity of the steel $-\frac{dT}{dt}$=temperature drop of the steel due to the radiation losses.

Substituting the value of $$\frac{dT}{dt}$$

from Equation 3 into Equation 2 an expression for the temperature, $t$, independent of the emissivity factor $E_r$ is obtained:

$$T = -\frac{4W^2}{W'C_p} \quad (4)$$

In accordance with the present invention, Expression 4 is instrumented to compute temperature by using the signals from two spaced detectors to measure radiation rate at two spaced points from which the value of the derivative of the radiation rate can be obtained for evaluating Equation 4.

Referring now to the drawing a system for utilizing the invention to measure the temperature of a steel strip in a rolling mill will be described. The steel strip 11 moving at high speed in the rolling mill passes under a first radiation detector 12 and an interval of time $\Delta t$ later the same point on the strip 11 passes a second radiation detector 13. The signals detected by the detectors 12 and 13 produce respective electrical analog quantities $W_1$ and $W_2$ in accordance with Equation 1 as determined by the radiation rate from the strip 11. The signal $W_1$ from detector 12 is applied to an electrical delay device 14 which is arranged to delay the signal by an interval to the time interval $\Delta t$ required for the trip 11 to pass from the detector 12 to the detector 13. The delayed signal $W_1$ from detector 12 and the undelayed signal $W_2$ detector 13 are both supplied to a subtraction circuit 15 which may be arranged to apply suitable proportionality constants in relation to the interval $\Delta t$ to produce an output quantity proportional to the incremental ratio which in the limit would equal the time derivative of the quantity $W$. Thus the signal from detector 12 provides the time function $W(t)$ and the detector 13 supplies a signal $W(t+\Delta t)$ so that by taking the difference of the two signals a signal is obtained in accordance with the following relation:

$$W'(t) \simeq \frac{\Delta W}{\Delta t} = \frac{W(t+\Delta t) - W(t)}{\Delta t} \quad (5)$$

The signal $W_2$ from detector 13 is also supplied to a squaring circuit 16 which produces an output quantity related to $W_2^2$. This signal is applied to a divider circuit 17 as the numerator. The quantity $W'$ from the derivative circuit 15 is applied to divider 17 as the denominator. The divider circuit 17 thus produces a quantity which is proportional to the absolute temperature $T$. By calibrating the signal obtained from the division circuit 17 in accordance with the constants in equation 4 an output quantity is obtained which can be applied directly to an indicator 18 for indicating the temperature of the steel strip 11. The signal quantity so obtained from the divider 17 and the indication on indicator 18 are independent of the emissivity, $E_r$, as previously explained. The signal from the divider 17 may also be applied to a controller 19 for performing any desired control function in accordance with the actual temperature of the strip 11 as may be desired.

While one particular embodiment capable of providing a solution of Equation 4 has been described it will be understood that the invention is not limited to the particular embodiment disclosed but may be utilized with any other arrangement which is capable of measuring the required quantities. Thus any form of differentiating circuit can be employed at element 15 for differentiating the delayed signal from detector 12. The invention is also capable of being used with any other arrangement which may be employed to derive the time derivative of the radiation rate W. Accordingly the invention is to be considered to be roadly applicable to various arrangements for instrumenting the calculation required and not limited to the particular disclosed embodiment but only by the scope of the appended claims.

I claim:

1. A system for obtaining the temperature of a moving material comprising means for sensing a first quantity proportional to the radiation rate from said material, means for obtaining a second quantity proportional to the time derivative of said radiation rate, and combining means for obtaining the ratio of the square of said first quantity to said second quantity to obtain a computed quantity proportional to the temperature and independent of emissivity.

2. A system for obtaining the temperature of a moving material comprising means for sensing signals proportional to the radiation rate at first and second points on said material with said second spaced downstream in the direction of travel from said first point, means for delaying the signal sensed at said first point by an interval equal to the time for the material to travel between said points, means for obtaining a difference signal between the delayed signal from said first point and the signal sensed at said second point, means for obtaining a signal proportional to the equare of the radiation rate, and means for dividing the last named signal by said difference signal to obtain a quantity representative of the absolute temperature of said material.

3. Apparatus according to claim 2 and including means responsive to said quantity for controlling the temperature of said material.

4. Apparatus for obtaining the absolute temperature of a steel strip in a continuous rolling mill independently of the emissivity of the strip comprising a first radiation detector positioned to measure the radiation at one point on said strip, a second radiation detector positioned downstream from said first detector to measure the radiation at a second point on said strip, means for delaying the signal from said first detector by an interval substantially equal to the time required for said strip to move from said one point to said second point, means for obtaining the square of the signal from said second detector, means for subtracting the delayed signal of said first detector from the signal of said second detector to obtain a signal representative of the time derivative of the radiation rate from said strip, and means for obtaining a quantity proportional to the ratio of said square to said derivative representative of the absolute temperature of said strip.

References Cited in the file of this patent

UNITED STATES PATENTS

| | | |
|---|---|---|
| 2,674,155 | Gibson | Apr. 6, 1954 |
| 2,846,882 | Gray | Aug. 12, 1958 |

OTHER REFERENCES

Publication "General Electric Review" of March 1941, pages 167 and 173. (Copy available in the Scientific Library of the Patent Office.)